United States Patent
Carlson et al.

[11] 3,773,659
[45] Nov. 20, 1973

[54] SYSTEM FOR PROCESSING WASTES

[75] Inventors: Lee Gerald Carlson, Clarendon Hills; Gustav A. Ronsen, Wheaton, both of Ill.

[73] Assignee: Babson Bros. Co., Oak Brook, Ill.

[22] Filed: Dec. 16, 1970

[21] Appl. No.: 98,589

[52] U.S. Cl. ............................ 210/7, 99/2, 119/1, 119/27, 210/11, 210/17, 210/151, 210/195
[51] Int. Cl. ............................................. C02c 5/06
[58] Field of Search ............... 210/11, 15, 17, 3–9, 210/150, 151, 194–197; 99/2; 119/1, 27

[56] References Cited
UNITED STATES PATENTS

| | | | |
|---|---|---|---|
| 3,645,893 | 2/1972 | Rohrer | 210/60 X |
| 3,543,937 | 12/1970 | Choun | 210/150 |
| 3,112,261 | 11/1963 | Porter et al. | 210/151 X |
| 2,022,329 | 11/1935 | Tsuda | 210/151 |
| 326,221 | 9/1885 | Hyatt | 210/151 |
| 3,269,542 | 8/1966 | Renzi et al. | 210/151 |
| 3,408,289 | 10/1968 | Gustafson | 210/37 X |
| 3,261,779 | 7/1966 | Sullins et al. | 210/151 X |
| 3,494,463 | 2/1970 | Vermette | 210/151 X |
| 2,008,507 | 7/1935 | Laughlin | 210/151 |
| 3,375,116 | 3/1968 | Anthony | 99/2 |

*Primary Examiner*—Michael Rogers
*Attorney*—Hofgren, Wegner, Allen, Stellman & McCord

[57] ABSTRACT

The present invention provides a system for biodegrading manure or similar waste products from animal subjects such as human beings, cows, steers, swine, chickens or other domestic animals. The manure is introduced as mixed solid and liquid waste into a holding tank and water is added as needed. The liquid manure portion is withdrawn from the holding tank and delivered downwardly through a multilevel perforated horizontal plate aerator tower in combination with air or other oxygen containing gas so as to practically fill the tower with bubbles between the horizontally disposed plates. Liquid flowing from the bottom of the tower contains a substantial amount of foam and the liquid-foam mixture is delivered to a reaction vessel. Most of the liquid is recycled from the reaction vessel at a high flow rate back to the top of the tower providing a flowing cyclic stream. Liquid manure from the holding tank can be introduced into the cyclic stream at any point, e. g., into the top of the tower or into the reaction vessel. Solid grass and the like can be recovered as a separate product from the holding tank.

A second stream of liquid, very low volume and low flow rate compared to the tower recycle stream, is delivered from the reaction vessel through an enzyme or settling vessel in which an enzyme producing culture provides further biodegradation. Product water is recovered from the enzyme vessel and can be deflocced, coagulated and further purified, such as by means of an ion exchange system, filtering or the like, even to the extent that it becomes potable water. A slip stream can also be withdrawn from the enzyme vessel and used to prewash product solids such as undigested grass, corn, etc., recovered from the holding tank and/or for recycling to the holding tank as an inoculum. Effluent from the settling vessel is used for secondary washing of the product solids. The liquid effluent returns to the agitating vessel.

The floc recovered from the deflocing step apparently contains all of the phosphates from the manure and is useful as a fertilizer. Any grassy residue from the holding tank, e. g., as would be recovered from cow manure or the like, can be washed and used either as feed or bedding. In use, the system forms a portion of a partial life cycle in that feed or bedding recovered from the system can be used to resupply the animals which produced the manure and fertilizer from the floc component can be used to fertilize grazing lands. Useful gases, e. g., ammonia and carbon dioxide, can also be recovered from the system.

30 Claims, 7 Drawing Figures

INVENTORS
LEE G. CARLSON
GUSTAV A. RONSEN

BY Hofgren, Wegner, Allen, Stellman & McCord
ATTORNEYS

SYSTEM FOR PROCESSING WASTES

BACKGROUND OF THE INVENTION

FIELD OF THE INVENTION

This invention relates to the processing of manure and like waste materials.

DESCRIPTION OF THE PROBLEM AND THE PRIOR ART

IN GENERAL

Recently there has been an increasing demand for pollution control devices. For purposes of air and water pollution control, some states and municipalities have regulated the composition of liquid and gaseous effluents from manufacturing operations, sewage treatment operations, farm operations and other processes of a chemical or biological nature. Water pollution is mostly caused by direct addition of pollutants by man to the water or by addition to the land which eventually find their way into the water. The best solution to water pollution appears to be to cease adding pollutants to nature and to put back into the land only those materials that were previously taken from the land. As an example, in a dairy feed-lot operation the ideal balanced situation would be to refertilize the grazing land solely with waste materials from the cows, or a fertilizer equivalent thereto. As a practical matter, some supplement will likely always be required because the balance can not be that precisely controlled.

There are a variety of animal waste processing systems in the prior art. Human waste and sewage disposal has long been a problem and almost every city and town has some form of sewage disposal based on a man constructed chemical or biological treatment system. Most of these systems are entirely outmoded in light of recent technology. Additionally, the present systems are totally inefficient when the results of processing are compared with theoretically feasible results.

Many times "animal" population, whether it be in a small town or in a feed-lot operation, is too small to warrant the expense of effective waste treatment involved in treatment systems of the type now used. As a result, much waste treatment in such situations is only primary treatment or at best secondary treatment. As an example, the following is directed to a resume of present waste treatment processes for a feed-lot operation which may involve anywhere from about 100 dairy cows to thousands of dairy cows.

DAIRY COW FEED-LOT OPERATION AND WASTE TREATMENT

A 1,000 pound dairy cow normally produces 100 pounds of total liquid and solid waste per day, about 90 percent of which is liquid and the remainder is solid. A small 100 cow feed-lot operation, therefore, produces 5 tons of waste per day and larger feed-lot operations produce commensurately larger amounts of such waste. Heretofore cow manure did not present too much of a problem because land was plentiful and nature could complete the chemical cycle from grass to grass. However, as human population grows, land per cow becomes less plentiful, to the extent where cows may soon have to spend most of their time in stalls, merely eating, growing and excreting, similar to the way chickens are now raised. Under such circumstances, a cow could literally drown in her own waste within two weeks if the waste were not removed. The five-day biological oxidation demand (BOD) per pound per day is 0.3 percent of the cow's weight, requiring that much oxygen to biodegrade the daily excretion of the cow.

Turning now to specific prior methods for biodegradation of cow's waste, one of the earliest methods was by lagooning. Lagooning involves degrading of the cow's waste into a lagoon or stabilization pond where bio-oxidation is effected. A rule of thumb for sizing of a lagoon for a 1,000 pound cow is to provide 230 cubic feet of water per cow. This is a fairly large volume if a 1,000 cow herd has to be processed by lagooning for waste disposal. Additionally, solids build up in the lagoon and these must be removed periodically.

Later aerated lagoons were developed and these are currently the most popular method of cow waste disposal. The aerated lagoon utilizes a much smaller lagoon and oxygen is forced into the aqueous material by a floating aerator located in about the middle of the lagoon, held in place by guy wires. A propeller causes the water to comingle with air so that the air dissolves and activates enzyme activity for breaking down the organic matter in the pond or lagoon into carbon dioxide, water, nitrates, nitrites, etc. The solids are kept in suspension and in intimate contact with available oxygen for viable chemical degradation by the velocity of the water in the vicinity of the aerator. As the solids change in density due to chemical action, their ability to stay in suspension is lessened, and obeying Stokes law, the solids then settle to the bottom as an inert substance or as a substance which undergoes anaerobic degradation. When a lagoon fills up with solids it is left to dry, filled in and another lagoon used.

The pond or lagoon normally has a weir at the outlet end for draining the pond to a nearby stream or the like and the velocity of the water which keeps the solids in suspension causes some of the solids to flow out over the weir to drain so that the buildup of solids in the lagoon is lessened permitting the lagoon to be serviceable for a longer period of time.

Although aerated lagoons are relatively inexpensive, are operative in cold climates and require minimum maintenance, they have a major disadvantage in their loading characteristics in that they are not very flexible since too light or too heavy loading can cause the enzyme producing organisms to become anaerobic, causing a different and usually slower biodegradation of organic matter, or just bacterial population die-off.

One large drawback about lagooning and other processes for processing cow waste is that the phosphates and nitrates still remain in the treatment water and in objectionable amounts. The phosphates are more difficult to eliminate than are the nitrates which can conceivably be and sometimes are removed by anaerobic bacterial action but such action is undesirable in lagooning because it can upset the balance of the aerobic activity.

With the more strict antipollution regulations which control phosphates, nitrates, BOD, chemical oxidation demand (COD), and total dissolved solids (TDS) to a minimum concentration and total poundage per day for drainage into receiving streams, sewers, rivers, etc., it becomes apparent that a total recycle system, from earth to earth, is becoming more and more desirable to produce water pure enough for discharge and reuse.

ADDITIONAL BACKGROUND MATERIAL OF INTEREST

Returning to the concept of overall waste disposal and especially human waste disposal, activated sludge and modified activated sludge processes form the background of most modern sewage treatment plants. One early activated sludge process is described by J. A. Coombs in U. S. Pat. No. 1,904,916.

Of more interest with regard to background material for the present invention is the sewage purification treatment system described by J. W. Hood in U. S. Pat. No. 2,658,034. The Hood patent includes a good discussion of biological oxidation, optimum conditions and the causes and effects of such oxidation in sewage disposal. However, it should be pointed out as a preliminary matter that the results of operation of the system of the present invention do not always correlate with the results and premises of Hood, especially as to the pH conditions for efficient decolloidization as discussed by Hood.

One other patent of interest is Gustafson U. S. Pat. No. 3,408,289.

SUMMARY OF THE INVENTION

This invention provides a new and improved method for treating liquid biodegradable organic waste products. The method involves forming a mixture of the liquid waste and oxidizing enzymes, such as can be produced by a bacteria. The liquid is processed to produce a film which has both surfaces of the film exposed to oxygen, e. g., in the form of a bubble, until the organic material is biodegraded to the extent desired. Usually the film or bubble will be formed and maintained for a limited period of time, broken and then reformed.

In normal operation, the intermittent forming and reforming of the film involves a recycle operation for redelivering the liquid material through a bubble forming apparatus. In a preferred form, such an apparatus can be a tower having a plurality of vertically spaced, horizontally disposed perforated plates, usually with round holes in the plates. The liquid material can be delivered through the tower in cocurrent or countercurrent flow with air or other oxygen containing gas for producing the bubbles and maintaining the contact with oxygen. Also in the preferred form the material received from the bottom of the tower, after bubble formation, is passed through a reaction chamber before recycling through the bubble tower and material in the reaction chamber can be withdrawn and further processed.

As a typical illustration of the type of system which can be provided by the present invention, the present invention contemplates the use of two cyclic flows, including the cycle which recycles through the bubble tower and another much slower "cyclic" stream which feeds raw material to the first cycle and withdraws a product therefrom. The product can be further processed, e.g., for separation of floc, for decolorization, and/or for recovery of residual organic ionic materials, and then recovered as purified water or recycled to the source of raw material thereby providing total recycle in the system.

Further in accordance with this invention there is provided a partial life cycle involving the collecting of waste materials from animal subjects, the processing of waste materials by the above means or similar means and the re-use of processed waste material as feed material or bedding for the animal subjects and/or as fertilizer for growing feed materials for the animal subjects.

DESCRIPTION OF THE PREFERRED EMBODIMENTS

Figure 1:
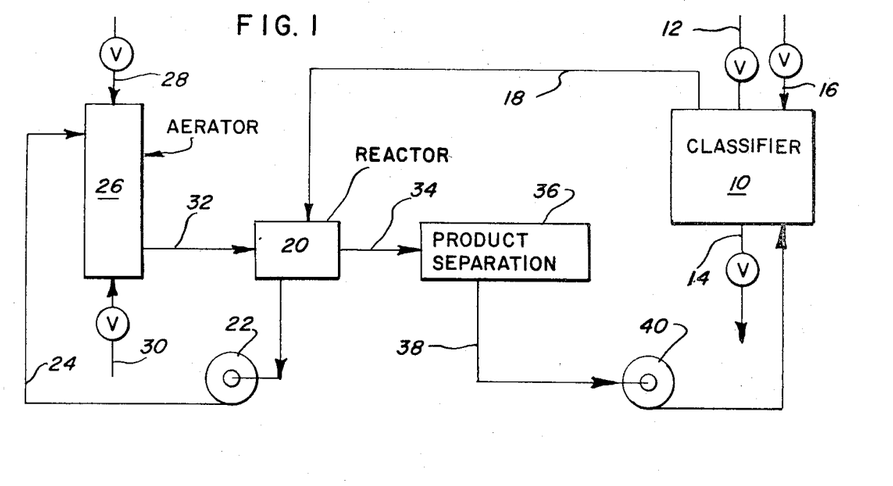
FIG. 1 is a schematic flow scheme illustrating a form of the biodegradation system of the present invention.

Referring first to FIG. 1, there is illustrated a generalized flow scheme of a system using a relatively fast flowing cycle for aeration of feed material and a relatively slow flowing cycle for delivering fresh feed material and recycling inoculum through the system. More specifically, the system includes a hold tank or classifier 10 which contains a supply of biodegradable feed material. The feed material can be introduced into classifier 10 via line 12 either on an intermittent batch-wise schedule or as a continuously flowing stream. The material introduced through line 12 will usually contain significant amounts of water in the form of floor washings or urine, but normally additional water will be needed and can be supplied as needed by water inlet line 16. In those instances where the biodegradable material contains substances which are not water dispersible, such as bedding materials or the undigested or partially digested materials, known as "grass" in cow manure, the non-water dispersible residue can be withdrawn through line 14. Line 14 can also be used to drain classifier 10 for cleaning purposes and the like.

The aqueous dispersion of biodegradable material is supplied by feed line 18 to a reactor 20. From reactor 20 the aqueous material is continuously withdrawn by pump 22 and delivered through recycle line 24 and through a reaction or aeration tower 26. Tower 26 can be supplied with air via air inlet 28 for cocurrent air and liquid flow, or via line 30 for countercurrent air and liquid flow. Liquid and/or foam is recovered from the tower 26 via reactor return line 32 and is directed into reactor 20 for recirculation through recycle line 24. Biodegraded product can be withdrawn from reactor 20 at a low rate of flow through line 34 for further processing, such as further enzymatic reaction, separation of solids, liquids and gases in the product separation system indicated generally at 36. A low flow slip stream of material is withdrawn through inoculum recycle line 38 on either an intermittent or continuous basis and delivered via pump 40 back to hold tank 10. Tank 10, feed line 18 and recycle line 38 constitute the low flow rate cycle. It is apparent that the reactor 20 functions as a crossover between the low flow rate cycle and the higher flow rate aeration cycle, for supplying fresh feed to the recycling inoculum from the high flow rate cycle.

Figure 2:
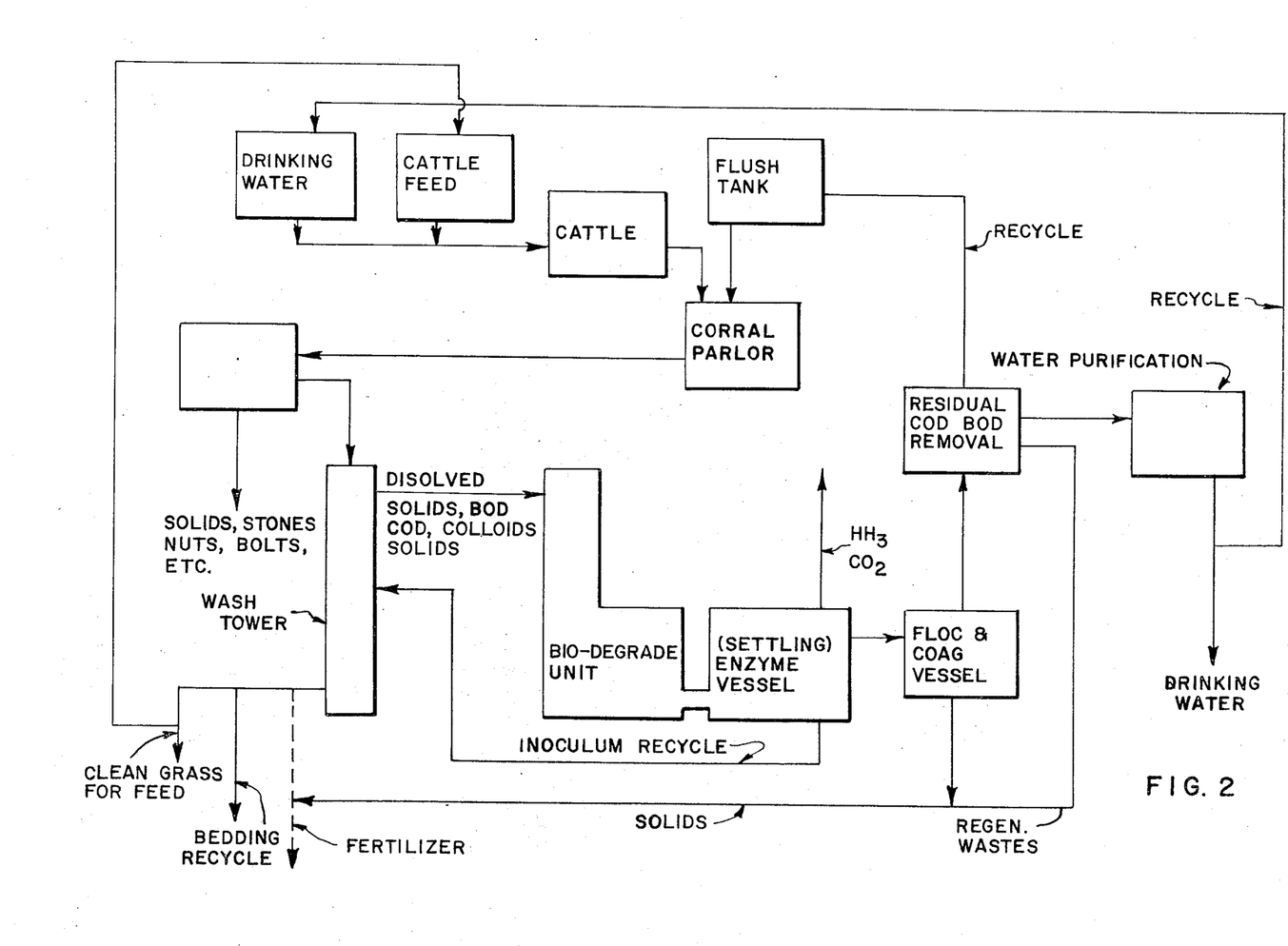
FIG. 2 is an overall block diagram flow scheme showing a biodegradation system of the present invention as an integral part of a feed lot operation.

FIG. 2 is an overall block diagram and flow scheme showing a biodegradation system as an integral part of a feed lot operation. Referring to FIG. 2, the cattle receive feed and drinking water and produce waste products which are flushed from the corral or parlor using water from a flush tank. The waste products are collected in the form of a liquid manure in a holding tank. The manure, of course, contains considerable solid material. If desired, a primary treatment can be carried out for removing solids, stones, nuts, bolts, etc., and the biodegradable material can be further broken up during the primary treatment.

The material from the holding tank is then delivered into the biodegradation system and is received by a wash tower to which makeup water can be added as needed or desired. The dissolved solids, colloidal material and suspended solids are delivered as an aqueous stream from the wash tower into the biodegradation unit where they are aerated, e.g., by the fast flow cycle of the system of FIG. 1.

In the system of FIG. 2, a separate settling or enzyme vessel is provided beyond the reaction vessel portion of the biodegradation unit. Enzyme activity is carried out in both the reaction vessel and the enzyme vessel. The enzyme vessel, when used, will normally form a portion of the low rate of flow cycle and inoculum can be recycled from the enzyme vessel, e. g., to the wash tower. Gases, mainly ammonia and carbon dioxide, can be vented or can be recovered for other use from the reaction or settling vessels. The material is delivered from the settling vessel through a flocculation and coagulation system, a residual COD and BOD removal system and further water purification systems as desired or needed.

The floc is fertilizer and can be absorbed on the grasses removed from the wash tower to make it more conveniently usable. As a preferred fertilizer, the floc solids and regeneration wastes recovered from the flocculation and coagulation system and the residual from COD and BOD removal system, are absorbed as nutrients on the grasses. After the residual COD and BOD removal, the partially purified water can be recycled to the flush tank or, after further water purification, the water can be recycled to the drinking water supply.

In lieu of using the grass recovered from the wash tank as carrier for floc in a fertilizer, the grass can be used as bedding without further purification. Clean grass for use as cow feed may require further washing with water. Sufficient clean grass can be produced to supply up to 20 percent by weight of the feed for the cows serviced by the unit.

Figure 3:
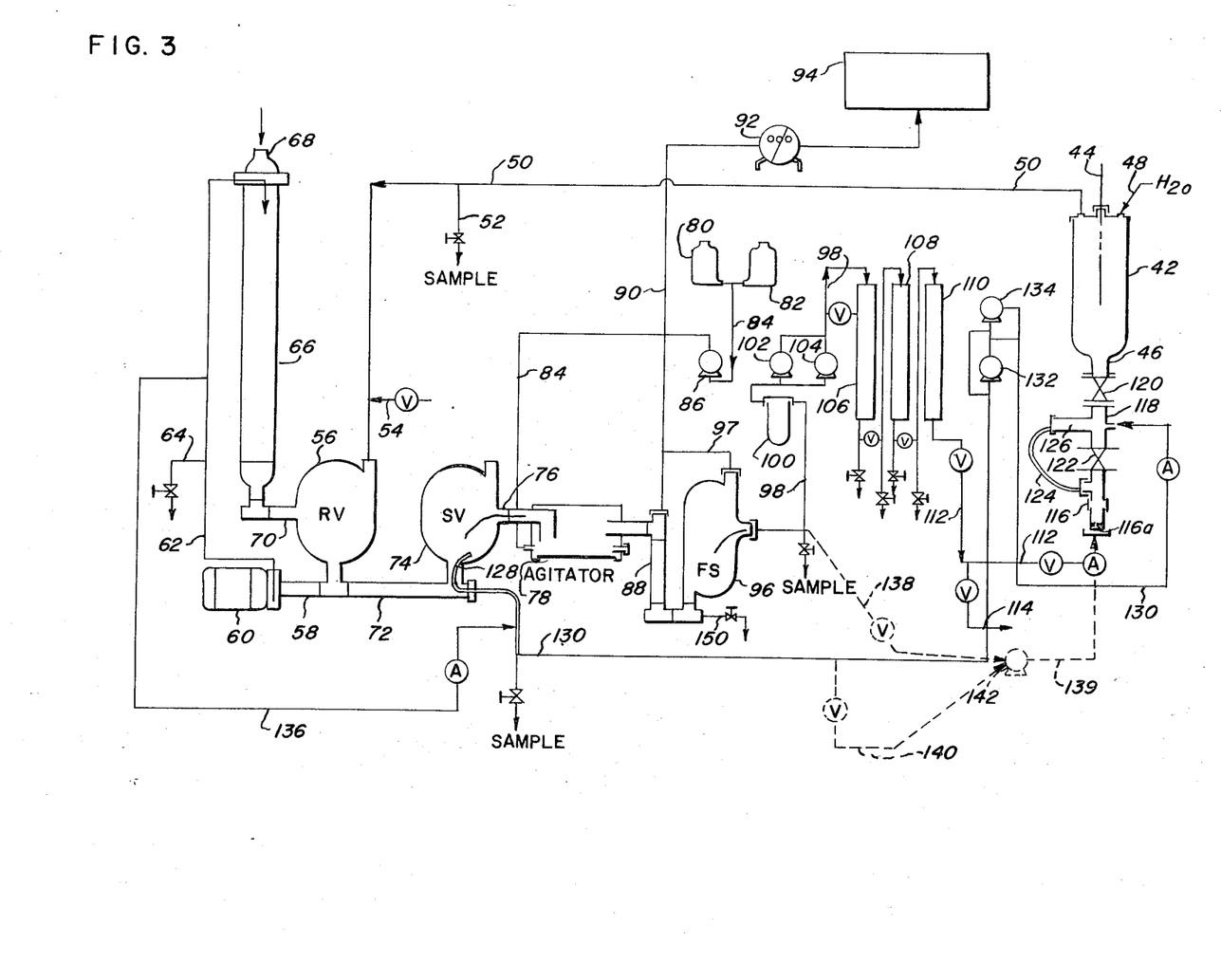
FIG. 3 is a more detailed flow scheme of one preferred embodiment of the present invention.

In FIG. 3 there is illustrated a more detailed system for processing cow manure. The manure is introduced into the system at the hold tank or classifier 42 by way of inlet 44. Hold tank 42 functions as a settling tank and solid grassy materials which settle to the bottom and can be removed from outlet neck 46. At 48 there is provided a water inlet for introducing water into the system as needed or desired. Classified liquid manure is delivered from classifier 42 via raw feed line 50 which is provided with a sample withdraw line 52 and an enzyme addition and makeup line 54. Raw feed line 50 directs the liquid manure into a reaction vessel 56 from which the liquid manure is pumped by pump 60 through a reaction tower 66 via recycle line 62 which is also provided with a sample takeoff line at 64.

The classified liquid manure from line 62 enters the top of reaction tower 66 which is also provided with an open top air inlet 68. The material flows downward in tower 66 concurrent with air entering inlet 68 and in intimate contact with the air. The liquid is formed into bubbles within tower 66 and suitable apparatus for this purpose will be described below. A mixture of bubbles and liquid flows from the bottom of reaction tower 66 through outlet line 70 and returns to the reaction vessel 56, from which the major portion is again recycled through lines 58 and 62 by means of pump 60 so that a continuous recycle is provided through reactor 56 and tower 66. A growth or culture of enzyme producing micro-organisms exists within reaction vessel 56 so that the liquid and foam subjected to enzymatic and aerobic biodegradation while in the reaction vessel.

A lesser portion of the liquid material in reaction vessel 56 flows through reactor discharge line 72 and into an enzyme or settling vessel (sv) 74 in which additional enzyme activity is carried out. The microorganism growth or culture within the settling vessel 74 appears to be different from that within reaction vessel 56, at least because the carbonate:bi-carbonate ratio differs. After a residence time within enzyme vessel 74 sufficient to effect the desired biodegradation, the liquid passes from enzyme vessel 74 via discharge line 76 and into a mixing chamber or agitator 78. Note that the discharge line 76 discharges liquid into the agitator 78 at a level below the normal liquid level within the agitator to trap against backflow of gases from the agitator 78 through line 76 and into enzyme vessel 74.

At the time the liquid leaves the settling vessel it has a pH of about 8.0 to 9.8. In agitator 78 the pH is dropped to within the range of about 4.3 to 5.4 by addition of alum, ferrous sulfate or ferric chloride from tank 80 through line 84 by pump 86. Polyelectrolyte can also be added from tank 82. The polyelectrolyte tends to dewater and make the floc settle faster. Along with or instead of polyelectrolyte, clays such as Bentonite in sodium form or Kaolinite can be added and these also tend to make floc settle faster and more compactly. The liquid and foam is thoroughly mixed within agitator 78 tending to break the foam down into liquid and gas phases and the mixture is dumped from the agitator 78 into outlet stack 88 which tends to further break the foam. The gases are vented through line 90 and gas meter 92 into a vent gas recovery system 94. Carbon dioxide, nitrogen, oxygen, other volatile compounds resulting from molecular degradation, and ammonia can be recovered in system 94 if desired. Alternatively the gases can merely be vented to atmosphere.

From stack 88 the liquid flows into a floc settler 96 and additional gases are vented through lines 97 into line 90. From floc settler 96 the liquid is delivered through outlet line 98 to a final settler 100 for removal of any remaining particles of solid material or floc and from final settler 100 the liquid is delivered by pumps 102 and 104 through an ion exchange system for further purification. The ion exchange system as illustrated includes, in series, a cation exchanger 106, a charcoal filter 108 and an anion exchanger 110, equipped with valved backwash or regeneration lines in normal fashion. In the cation exchanger the pH of the liquid drops, e. g., to within the range of about 2.0 to about 4.5, and is delivered at that pH through the charcoal filter 108 and into the anion exchanger 110. The pH of the liquid is raised, e. g., to within the range of about 6.5 to about 7.5 through line 112 in the anion exchanger.

The purified liquid can be withdrawn via valved line 114 and returned to the cattle drinking water supply or used for other purposes. Alternatively, the water can be directed by line 112 into a grass or final wash chamber 116 for washing grass which is to be used for feed purposes. Located above final wash chamber 116 and below hold tank 42 is an intermediate wash chamber 118 which receives solid grassy material from holding tank 42 through valve 120 and can supply chamber 116 with grass through valve 122. As will be described, the grass in the intermediate chamber 118 is first washed with a less than pure water product and then dropped into chamber 116 and supported on screen 116a. Purified or product water delivered into chamber 116 from line 112 passes through the grassy material and is discharged from chamber 116 via line 124, through check valve 126 and into chamber 118 as wash water. Wash water from chamber 118 is returned to the hold tank 42 through valve 120. After the grass is washed, screen 116a is removed and the grass is recovered from chamber 116 for use as feed and/or bedding.

An inoculum recycle system is provided for recycling enzymes and bacteria from settling vessel 74 to hold tank 42 and thence to reaction vessel 56 and the reaction tower-reaction vessel recycle system. Accordingly, there is provided a standpipe inoculum takeoff 128 for receiving inoculum containing liquid from settling vessel 74 for delivery through line 130 via pumps 132 and 134 and into intermediate chamber 118. By keeping valve 122 closed and 120 open the inoculum is recycled into hold tank 42. The inoculum recycle stream also functions as a wash liquid as it passes through chamber 118. This recycle can be continuous or intermittent.

The aerator tower-reaction vessel cyclic system is operated by pump 60 which generates a pressure slightly higher than atmospheric pressure so that pressure from the recycle line 62 can be used to drive other liquid streams throughout the system via a venturi effect. In the illustrated form, for example, this pressure is optionally used via line 136 to deliver inoculum from the standpipe takeoff 128 through the inoculum recycle line 130 thereby eliminating the need for pumps 132 and 134.

An optional valved clarifier bypass line 138 is provided so that discharge material from flocculation settler 96 can be delivered by pump 142 via line 139 directly into line 112 for washing grass in chamber 116 for bedding. There is also an optional valved bypass line 140 for delivering liquid from line 130 via pump 142 and line 189 as wash liquid for washing grass in chamber 116 and for return of inoculum eventually to hold tank 42.

In addition to producing bedding and/or feed and purified water the illustrated system produces a floc material useful as fertilizer. This by-product can be recovered from flocculation settler 96 via valve line 150. The recovered floc apparently contains all of the phosphates from the waste material treated within the system.

Based on pilot plant operation of a system such as that described with reference to FIG. 3, a specific example of operation will be given for handling the waste material from 100 cows per day in a typical feedlot operation. In order to accommodate the waste products from 100 cows a day the system must handle 150 pounds BOD and 840 pounds COD per day. The waste material is introduced into hold tank 42 on a batch by batch basis and water can be added as desired through line 48. In this example about 10 percent water was added based on weight of the waste material. The liquid material from hold tank 42 is delivered through line 50 at a rate of 1.04 gallons per minute at 200 to 10,000 mg/l C.O.D. into reaction vessel 56 and is recycled through the aerator tower 60 at a rate of about 0.61 gallons per minute per square foot of tower cross section. Suitable enzymes and enzyme producing organisms, such as Biochemical Lab S-250 or S-55 (mixed proteases, lipases, amalases, cellulases, etc.) are added at line 54. The total recycle residence for each cycle through the aerator and reaction vessel is about one minute and the overall residence time of the liquid material within the combined reaction vessel and aerator tower recycle system is about 80 minutes. The liquid is then delivered through line 72 into the settling vessel for approximately 80 minutes additional residence time. The reaction vessel and enzyme vessels are each about 400 gallon tanks with about 200–300 gallon liquid levels.

The agitator is a 40 to 60 gallon tank having about a 30 gallon liquid level and the residence time within the agitator is about 30 minutes. The floc removed on a batch-by-batch basis through valve line 150 each day contains about 38 pounds nitrogen, 35 pounds potassium and 11.5 pounds of phosphorous so it is an excellent fertilizer product. The floc settler 96 is about 200 gallons capacity and the residence time of the liquid within the floc settler is between 30 and 200 minutes. The liquid delivered from the floc settler through line 98 has about 200 to 600 mg/l C.O.D. and is delivered through the ion exchange system at a flux rate of about 5 to 10 gallons per minute per square foot and then through chamber 116 at that same flux rate. The flux rate of material from line 130 into chamber 118 is about 5 to 20 gallons per square foot. The total system requires 1.5 brake horsepower for operation.

Operation of the pilot plant revealed that the energy requirements were much lower than for conventional floating aerators. Floating aerators normally require 5 to 10 horsepower for servicing 100 cows per day while the present system services 100 cows per day with 1 to 2 horsepower at a 45 foot head. Further, in conventional floating aerators about 1.2 pounds of oxygen are required for each pound of B.O.D. and about 0.5 pounds of enzyme producing organisms are produced per pound of B.O.D. In operation of the present system for 100 cows at about 0.1 pound B.O.D. per minute, 0.094 pound oxygen are required per minute and the system produces substantially less enzyme producing organisms. Thus the enzymes do more work per unit than in conventional floating aeration.

Figure 4:
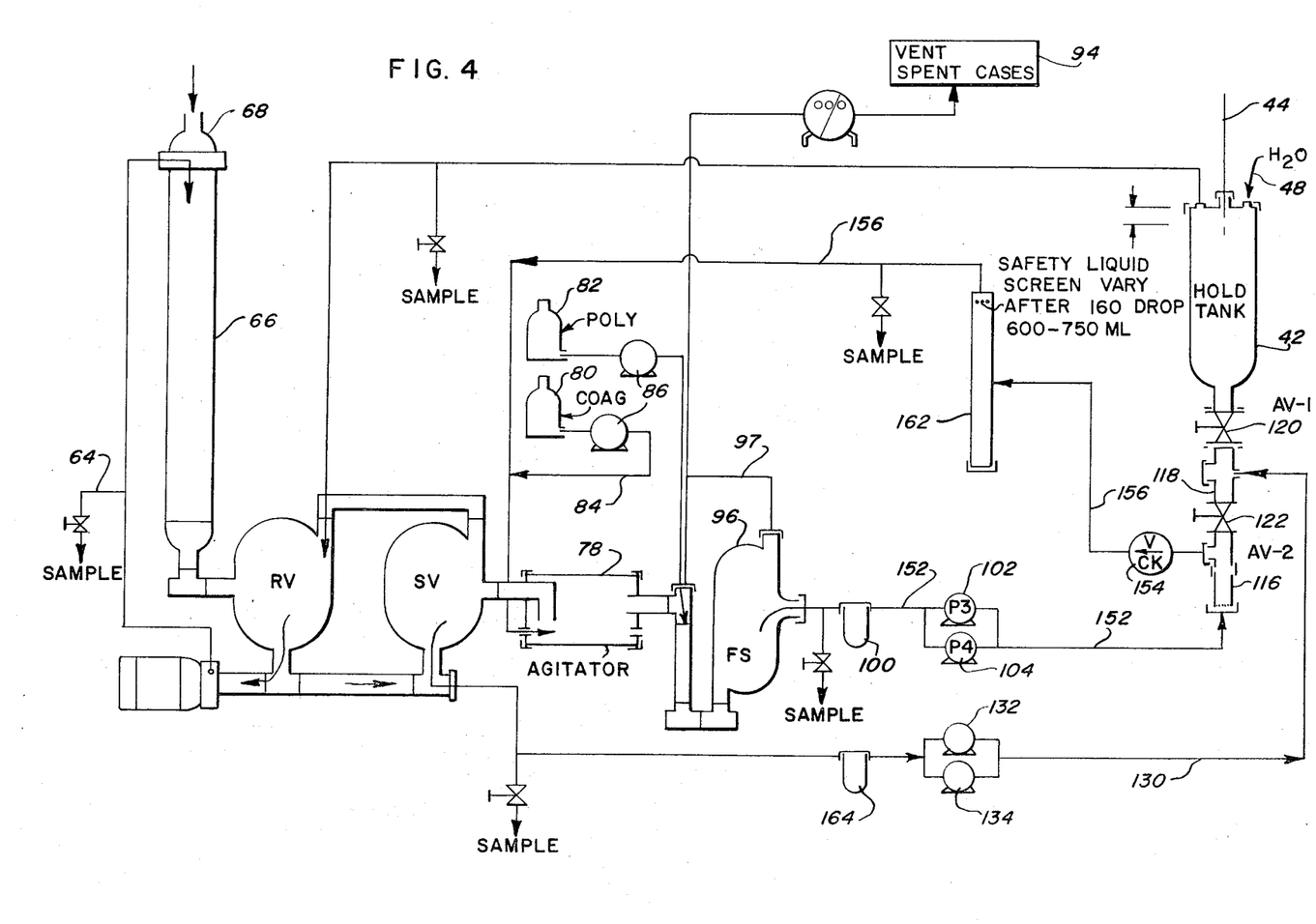
FIG. 4 is a flow scheme of a modified and improved system which is capable of total liquid recycle.

The system shown in FIG. 4 is a total recycle system similar to that in FIG. 3. The main difference is that the ion exchange system downstream from final settler 100 has been eliminated and the product water is recycled directly by line 152 from final settler 100 to chamber 116 and then through check valve 154 and recycle line 156 back to agitator 78. Sight gauge 162 is provided in recycle line 156 to give a visual check of the turbidity of the recycle stream. When there is no grass present in chamber 116 the recycle stream passing through sight gauge 162 is usually clear. A safety screen 160 is provided in the top of sight glass 162 for preventing recycle of any grass or other particulate material that might be washed into the sight glass 162 through line 156.

Also in the system of FIG. 4 line 130 passes the enzymes and microorganisms through a settler 164 prior to delivery to chamber 118 as wash liquid. It will be noted that the plumbing to the grass wash chambers 118 and 116 has been modified so that the grass can first be dropped to chamber 118 and washed with the inoculum recycle entering through line 130 for removal of suspended and some soluble matter from the grass. The grass can then be dropped to chamber 116 and final washed with clear water delivered to chamber 116 through line 152. The recycle inoculum liquid in line 130 has a C.O.D. and a B.O.D. of about 1,000 mg/l while the product water in line 152 has a B.O.D. of 0 to 600 mg/l, a C.O.D. of 300 to 1,000 mg/l and a T.D.S. of 300 to 3,000 mg/l.

The system of FIG. 4 was operated by delivering liquid manure from hold tank 42 through line 50 to reaction vessel 56. The liquid material in line 50 contained suspended and soluble matter and had a C.O.D. and B.O.D. in the range of 1,000 to 20,000 mg/l. Valve 120 was kept open and valve 122 was kept closed to divert liquid entering through line 130 into tank 42 for recycle through line 50 and to divert liquid entering line 152 through the chamber 116 and then through line 156. In operating the system illustrated in FIG. 4 on one run various analyses were made. The product water had a B.O.D. level measured at 0 when tested, although it is assumed that the B.O.D. level will often be around 0 to 20. The C.O.D. level was 350 mg/l. The T.D.S. in a final settler was 2,220 mg/l but after the liquid was used to wash the grass in chamber 116 the T.D.S. dropped to 350 mg/l.

Figure 5:
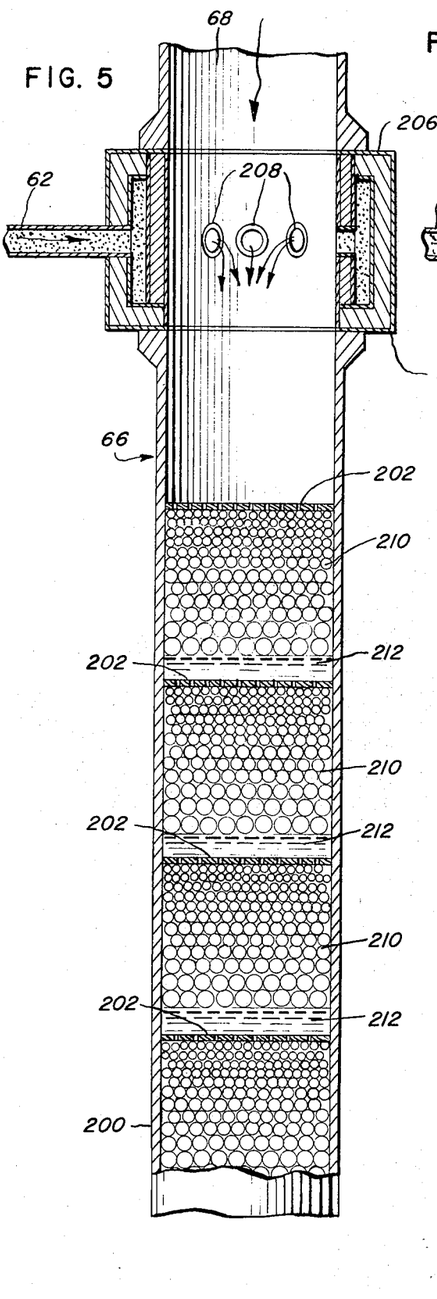
FIG. 5 is a section through the top of an aeration tower useful in the systems of FIGS. 1–4.
Figure 6:
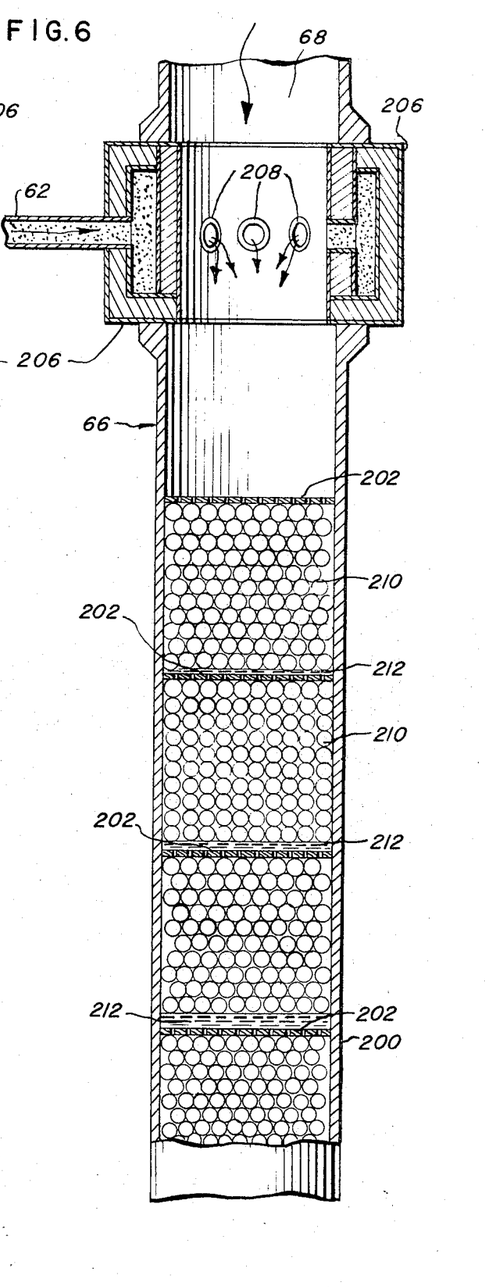
FIG. 6 is a section through the tower of FIG. 5 showing bubbles being formed under conditions different from those in FIG. 5.

A form of the reaction tower 66 of the present invention is shown in more detail in FIGS. 5 and 6. The tower includes a plurality of horizontally disposed vertically spaced plates or trays 22 having round circular perforations 204 contained within a tubular shell 200. For receiving recycle liquid from line 62 there is provided a flow distribution manifold 206 which distributes the liquid around the top of the tower for delivery through spaced inlet ports 208 into the tower and on to the first perforated tray 202. Air is drawn in through air inlet 68 so that as the air and water flow downwardly through the tower there is created a mass of bubbles 210 on top of a smaller volume of liquid 212 on each tray 202 below the top tray 202. The liquid 212 flows through the perforations in the tray 202 therebelow creating small air bubbles which gradually grow in size as they descend toward the next tray 202 and reform into the next mass of liquid 212. The bubble condition illustrated in FIG. 5 is attained when the liquid is delivered through the tower at a rate which would be sufficient to keep the tower two-thirds full of liquid.

It is believed that the intermittent formation of the bubbles and their collapse tend to reduce the concentration of toxic gases and other toxic substances in the liquid which is reformed into a bubble film so that the reaction in the film proceeds with less hindrance from these substances, i. e., the microorganism population is decreased less because of such toxic substances, resulting in production of more of the desirable enzymes and the reaction rate in the film is thereby enhanced. Because reaction equilibrium conditions are reached faster in the film, collapse and reformation of bubbles establishes more favorable conditions for driving the reaction forward. Although the kinetics of the reaction rates thereby change, the equilibrium constant, of course, does not.

Turning to FIG. 6, a different bubble condition is illustrated. In FIG. 6 the liquid is being flowed through the tower at a rate which would normally be sufficient to keep the tower less than one-half full of liquid in the absence of bubbles and it is seen that below each tray the bubbles are formed and stay generally of uniform diameter as they pass down to a very thin liquid layer on the top of the next tray below.

The continual recycle of liquid through the aeration tower saturates the liquid with oxygen in a very short period of time compared with prior aeration techniques. This assures that the entire flow system will be kept completely aerobic, thereby minimizing production of odors. In working with the system it has been interesting to not that there is no microorganism growth on the trays in the aeration or reaction tower and it is believed that the recycling through the tower kills or prevents such growth.

In the pilot plant systems utilizing the flow schemes of FIGS. 3 and 4, the tower was a cylindrical glass walled tower 4 inches in diameter and about 4 feet in height. About 10 plates were secured within the tower on 4 inch spacings and the ports or perforations in the plates were ¼ inch in diameter and spaced ¼ inch from each other. The recycle through the tower was generally maintained at about 57 gallons per minute per square foot and the introduction of fresh feed through line 50 was kept at about 0.6 gallon per minute per square foot of tower cross section. In the system described above for handling of a feed lot operation based on 100 cows the tower is 18 inches in diameter and about 8 feet tall, with about 20 to 22 trays spaced 4 inches along the height of the tower. The ports or perforations in the trays are again ¼ in diameter and spaced ¼ inch from each other. This size of perforation was found to be convenient for bubble formation although much larger or smaller ports can be used. In the feed lot unit the recycle rate was kept at 100 gallons per minute and fresh feed delivered through line 50 was maintained at about one gallon per minute, thus giving a recycle:feed ratio of about 100:1.

Figure 7:
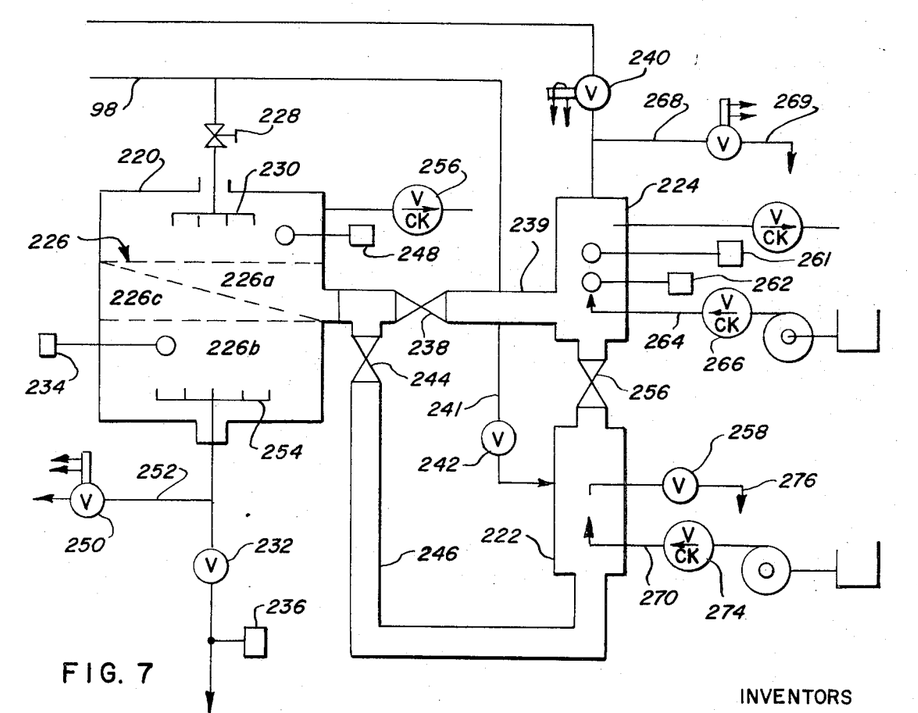
FIG. 7 is a schematic diagram of an ion exchange system utilizing a mixed bed which can be used in further purification of product water from the systems of FIGS. 1 – 4.

FIG. 7 is a flow scheme of an ion exchange system which is useful as a replacement for the system shown in FIG. 3. The ion exchange system is a mixed bed system in which the liquid from line 98 (FIGS. 3 and 4) is subjected to anion and cation exchange in a common vessel 220. For such mixed systems attention is directed to Stromquist et al U. S. Pat. No. 2,771,424 for background material. The system of FIG. 7 includes means for regeneration, classifying, backwashing, rinsing and remixing cation and anion exchange resins into a uniform resin bed. The regeneration, classifying, backwashing and rinsing are accomplished in vessels 222 and 224. The system is especially designed for use with cation exchange resins and anion exchange resins which differ from each other in density.

Vessel 220 is illustrated as containing a resin bed 226 which has an upper layer schematically shown at 226a, a lower layer at 226b and an intermediate layer at 226c. During use of the bed the upper layer 226a reaches equilibrium first while the remaining lower portion 226b does not become fully loaded. The present system removes the upper 25 to 40 percent of the bed into a recovery vessel 224 using feed fluid as a hydraulic or fluidizing medium. The exhausted resin removed from vessel 220 is replaced by freshly generated resin from vessel 222. Thus, the downtime of vessel 220 is very short and the on-stream efficiency is very high, about 90 to 95 percent, as compared to 50 percent on-stream efficiency for the average regenerative ion exchange system, depending upon the concentration of ions to be removed.

In operation of the system shown in FIG. 7, liquid from the final settler 100 is delivered through line 98 and valve 228 into vessel 220 via distributor 230 located in the top of vessel 220 in the "freeboard". The liquid flows in an even flux down through the resin bed 226 and exchanges ions with those located in the resin. The product from the ion exchange bed exits through a screen defining a false bottom of the bed and is discharged through valved line 232. A sensor 234 is employed to detect the concentration of contaminants within the bed 226 and a second sensor 236 detects the concentration of contaminants in the product water leaving through valved line 232. When the contaminant level in either the bed or the product water reaches a predetermined concentration, the sensors signal the system to go into a regeneration mode.

Regeneration of the ion exchange system is initiated by one or both of the sensors 234 and 236 opening valve 238 and valve 240 while either closing or restricting valve 232. The incoming liquid from line 98 fluidizes the upper portion 226a of bed 226 and washes it through line 239 and into vessel 224. Then valve 250 is opened and valve 228 is either closed or partially closed so that fluidizing air enters the bed through line 252 and distributor 254 and moves the bed portion 226c through line 239 and into vessel 224. During introduction of air, liquid is present in vessel 220 to a level just above the resin level to prevent the air from stratifying the anion and cation exchange resins according to density. Valve 250 is closed. The depth of the bed 226b left in the vessel 220 is about 2 ½ feet, sufficient for the desired ion separation from the water entering line 98. The moved portion, i. e., layers 226a and 226c total about one foot in thickness.

Valves 238 and 240 are then closed when sensor 261 detects the top of the bed and valves 242 and 244 are opened so that feed water passing through line 241 forces freshly regenerated mixed anion and cation exchange resin from vessel 222 through line 246 and into vessel 220. Valves 244 and 242 are then closed. The amount of bed in bed portion 226b is sufficient to purify the feed water entering vessel 220 along with the regenerated resin. Thus, the bed in vessel 220 is brought back to its normal operating volume and valve 232 is regulated by a sensor 248 to maintain the liquid level just a few inches above the top of bed 226. Valve 250 is reopened and air entering line 252 and distributor 254 causes thorough mixing of the anion and cation exchange resins within the bed and the air vents through a check valve 256. Again the resins are not separated according to density because of the liquid present. Valve 250 is then again closed. Vessel 220 is now ready to resume processing and valves 228 and 232 are therefore opened.

As the resin bed portion was moved into vessel 224 under the force of feed water, the excess feed water was discharged through open valve 240 for recycle or drain. The air entering with bed portion 226c functions to fluidize the mixed resin bed in vessel 224 and thereby classify the bed into a lighter or upper portion containing the anion exchange material and a lower or heavier portion comprising the cation exchange material. To separate the resins valve 256 is open and cation resin is permitted to flow into vessel 222 until sensor 262, which is properly spaced for this purpose, detects the top of the bed material within vessel 224 and closes valve 256. This leaves the lighter anion material in vessel 224 and the heavier cation material in vessel 222.

During delivery of the cation material into vessel 222, vessel 222 is vented by opening valve 258. After valve 256 is closed, acid is pumped from an acid holding tank through check valve 274 and line 70, through the cation exchange resin within vessel 222 and is discharged through valve 258 and line 276 to waste until the cation resin is regenerated. In the upper vessel 224, valve 269 is opened and caustic is pumped through check valve 266 and line 264, through the anion exchange resin in vessel 224 and through line 268 to waste until the anion resin is regenerated. The pumping of acid and caustic is then stopped. Both resin masses can be rinsed with water if desired. Valve 256 is then opened and the cation material from vessel 224 drops into vessel 222. Valves 256, 258 and 269 are then closed and the mixed bed of regenerated ion exchange resin in vessel 222 is ready to be redelivered to vessel 223.

There are many ion exchange materials available for use in ion exchange systems and there is a wide variety of regeneration techniques which can be used. In the system described above the Amberlite ion exchange resins are examples of useful resins and these should be selected with reference to weight or density characteristics if the particular separation and classification system of FIG. 7 is used. The Amberlite ion exchange resins include such anion exchange resins as Amberlite IRA-401S and Amberlite IRA-900 which are strongly basic or quarternary ammonium anion exchange resins based upon styrene-divinylbenzene copolymer structures. Suitable cation exchange resins include the carboxylic cation exchange resins such as Amberlite IRC-50 and Amberlite IRC-84, and the sulfonic acid cation exchange resins such as Amberlite IR-120, Amberlite 200, Amberlite 252, Amberlite IR-120 and Amberlite IR-118. Ion exchange techniques are very well known in the art and suitable resins are available from numerous suppliers. For example, the Duolites from Diamond Shamrock Chemical Co. and ion exchange resins from Dow Chemical Company are equally suitable.

The gases recovered and separated in separation system 94 can be put to use in other portions of the system. For example, the carbon dioxide and ammonia can be used in the form of acidic and basic regeneration materials for the ion exchange system.

It is an advantage of the system of the present invention that organic material can be decomposed rapidly upon contact with enzymes secreted by species of bacteria or other microorganisms which are particularly adapted to degrade the molecules present in the waste material. Degradation is caused by oxidation or in some instances reduction in an aqueous vehicle which contains three phases, i.e., liquid, dissolved or suspended solids and gaseous oxygen, which are commingled for intimate contact to produce a rapid biochemical degradation. Some reduction activity by the enzymes is apparently helpful in maintaining microorganism cell growth, as is well known. The enzymes, as inoculum, hasten the reaction and the presence of oxygen during the aeration helps to drive the reaction more quickly to completion. Usually the inoculum is recycled after separation of the dead cells so that only the growing of most vital organisms is maintained within the system. The rate of recycle through the aerator is much greater than the rate of flow of entering material, e. g., g., 10 to 500 times as great. The rate of recycle of enzymes is usually in the ratio of .25:1 to 1:1 based on rate of feed being delivered from the hold tank to the reaction vessel.

A very important aspect of the present system is that it can provide total recycle in a waste disposal unit which can also produce food, fertilizer and other useful materials while minimizing an important pollution problem.

We claim:

1. The method of treating biodegradable aqueous liquid organic waste which comprises forming a mixture of the liquid and an oxidizing enzyme in a reaction zone in which a bacterial growth is sustained, delivering at least a portion of the mixture from said reaction zone and forming the delivered mixture into a film with both surfaces of the film exposed to oxygen, reforming a liquid from said film and returning the liquid to said zone, and redelivering at least a portion of said liquid from said zone to the film forming step until the organic material is biodegraded to the extent desired.

2. The method of claim 1 wherein said forming step comprises intermittently breaking and reforming the film for reestablishing more favorable reaction rates.

3. The method of claim 2 wherein said film is formed as a plurality of bubbles.

4. The method of claim 3 wherein said bubbles are formed by passing the aqueous liquid through a generally horizontally disposed perforated surface in contact with oxygen-containing gas.

5. The method of claim 4 wherein said passing step comprises delivering the aqueous liquid through a vertical tower having a plurality of horizontally disposed vertically spaced levels each comprising a perforated plate across said tower.

6. The method of claim 5 wherein air is flowed cocurrently with the liquid.

7. The method of claim 5 wherein the air is flowed countercurrently with respect to the liquid.

8. The method of claim 5 wherein said liquid is introduced at the top of said tower and downwardly through said plurality of perforated plates, the top of said column is open to atmosphere and the liquid draws air in through the top for cocurrent flow with the liquid downwardly through the column thereby filling spaces between said plates with bubbles.

9. The method of claim 8 including the steps of breaking the bubbles from the bottom of the tower to form a liquid and delivering a portion of said liquid through from the reaction zone a floc separator for separation of floc therefrom and recovering the liquid from said floc separator.

10. The method of treating biodegradable aqueous liquid organic waste which comprises passing the liquid downward through a multiple perforated shelf bubble tower in contact with air and converting the liquid into a mass of bubbles within the tower in the absence of appreciable bacteria growth on the shelves, said bubbles having both inner and outer surfaces essentially completely exposed to air, delivering the bubbles and the reforming liquid from the bottom of the tower to a reaction vessel in which bacterial growth is sustained, recycling liquid from the reaction vessel to the top of said tower for additional bubble formation therefrom and delivering some of the oxidized product from the reaction vessel for further processing.

11. The method of claim 10 including the step of delivering the oxidized product recovered from the reaction vessel to a settling or enzyme vessel in which a second different bacterial growth is sustained and recovering liquid from said enzyme vessel at a rate less than 10 percent of the flow rate of the recycle from the bottom of the tower to the top thereof.

12. The method of claim 11 wherein said oxidized product is delivered from the reaction vessel to the settling vessel in the form of a foam and said foam is recovered substantially therein.

13. The method of treating biodegradable aqueous liquid organic waste products containing oxidizing enzymes and in some cases reducing enzymes, particularly those involved in synthesis of living organisms, which comprises passing the liquid downward through a multiple level perforated shelf bubble tower in contact with air and converting the liquid into a mass of bubbles within the tower in the absence of appreciable bacterial growth on the shelves reconverting the bubbles to liquid and contacting the recovered liquid with a bacterial culture, recycling material and bacterial culture to the top of the tower, recovering a portion of the liquid from the bacterial culture contact zone adjusting the pH of the recovered portion of the liquid to below 6.5 and passing the recovered portion of the liquid through a mixed bed cation and anion exchange system for clarification of the liquid.

14. The method of treating biodegradable aqueous liquid organic waste products containing oxidizing and some reducing enzymes and capable of total recycle which comprises delivering a mixture of solid and liquid waste materials to a hold tank, circulating liquid material from the hold tank as an aqueous liquid organic waste product to the top of multiple level bubble tower, passing the liquid downwardly cocurrently with air through the plate bubble tower thereby converting the liquid to a mass of bubbles within the tower recovering liquid and foam from the bottom of the tower and delivering the liquid and foam to a reaction vessel, recycling at least 90 percent of the liquid delivered to the reaction vessel back to the top of the tower for rebubbling, recovering non-recycled liquid from the reaction vessel and treating the non-recycled liquid for separation of floc therefrom, delivering recovered liquid from the reaction vessel to a settling vessel, recycling a slip stream of the material from the settling vessel to the hold tank for inoculating material therein and releasing vent gases predominating in ammonia from the recovered liquid.

15. The method of claim 14 wherein said waste product contains grass and including the steps of recovering grass from the holding tank, mixing liquid material recovered from the floc separation step with the grass recovered from the hold tank to absorb a portion of the ions present in the liquid on the grass and effectively removing noxious, odoriferous molecules as a final washing operation.

16. The method of claim 15 including the step of mixing floc recovered from the floc separation zone with grass recovered from the hold tank for producing a fertilizer product.

17. The method of claim 14 including the step of recovering grass from the hold tank and drying the grass to form bedding and/or feed.

18. The method of treating biodegradable organic waste products which comprises establishing a first continuous cyclic stream at a high rate of flow of aqueous liquid waste products downwardly through an aeration zone in contact with air thereafter through a reaction vessel in which bacterial growth is sustained and thereafter by recycle from the reaction vessel to the top of the tower for redelivery through the tower, withdrawing a relatively low flow rate stream from said first cyclic stream and recycling the withdrawn stream through a supply of mixed solid and liquid organic waste products and returning the withdrawal stream to the first cyclic stream to thereby establish a second or low flow rate cyclic stream for delivering feed waste product to said first stream, withdrawing oxidized product from said first cyclic stream at about the same flow rate as the flow rate of said second cyclic stream is supplying waste product to said first cyclic stream, separating floc from the oxidized product and recovering the resulting liquid.

19. The method of claim 18 wherein the rate of flow of the second cyclic stream is from 0.05 to 10 percent of the rate of flow of the first cyclic stream.

20. The method of claim 19 including the step of clarifying the liquid recovered from the last step.

21. The method of claim 20 including the step of returning a portion of the clarified product to said supply of waste as makeup water.

22. A method of maintaining a partial life cycle which comprises collecting manure produced by a plurality of animal subjects, containing said manure in a holding tank in the presence of an aqueous medium, delivering an aqueous stream from the holding tank through an aeration zone together with oxidizing enzymes, forming the liquid into a film in the aeration zone with both surfaces of the film exposed to oxygen until the organic material is biodegraded to the desired extent, continuously recycling a major portion of the liquid recovered from the aeration zone back through the aeration zone and withdrawing another portion of the liquid, digesting the withdrawn portion of the liquid in the presence of a bacterial culture, separating phosphates and floc from the digested withdrawn material for use as fertilizer, continuously recycling a portion of the liquid as inoculum back through the holding tank for picking up additional organic waste and withdrawing grass from the holding tank and washing the withdrawn grass.

23. The method of claim 22 wherein said washing is with fresh water to produce a grass suitable for use as feed.

24. The method of claim 22 wherein said washing is with deflocced product to provide a grass product useful as cattle bedding.

25. The method of claim 23 including the step of feeding the recovered solid grass to said animal subjects.

26. Apparatus for treating biodegradable aqueous liquid organic waste products which comprises a hold tank for containing a mixture of solid and liquid waste materials, a multiple level perforated plate bubble tower, means for delivering the liquid from the hold tank together with air downward through said tower for converting the liquid to a mass of bubbles within the tower, a reaction vessel, means for recovering liquid and foam from the bottom of the tower and delivering the liquid and foam to the reaction vessel, means for recycling a major portion of the liquid from the reaction vessel back to the top of the tower for rebubbling, means for recovering nonrecycled liquid from the reaction vessel, a settling vessel, means for delivering recovered liquid from the reaction vessel to the settling vessel, means for treating the nonrecycled liquid for separation of floc therefrom, vent means for venting gases predominating in ammonia and carbon dioxide from the recovered liquid and means for recycling a slip stream of the material from the settling vessel to the hold tank for inoculating material therein.

27. Apparatus for treating animal waste products which comprises a holding tank for receiving animal waste products, means defining an aeration zone, means for delivering an aqueous stream from the holding tank through the aeration zone together with oxidizing enzymes, means in the aeration zone for forming the liquid into a film with both surfaces of the film exposed to oxygen, means for continuously recycling a portion of the liquid recovered from the aeration zone back through the aeration zone, means for withdrawing another portion of the liquid, means for digesting the withdrawn portion of the liquid in the presence of a bacterial culture, means for separating floc from the digested withdrawn material and means for continuously recycling a portion of the liquid back through the holding tank for picking up additional organic waste.

28. A method of maintaining a partial life cycle which comprises collecting manure produced by a plurality of animal subjects, containing said manure in a holding tank in the presence of an aqueous medium, withdrawing and washing the solids grass portion of the manure from the holding tank, delivering a combined stream of the liquid portion of the manure and the wash water through an aeration zone together with enzymes, forming the liquid into a film in the aeration zone with both surfaces of the film exposed to oxygen until the organic material is biodegraded to the desired extent, continuously recycling a major portion of the liquid recovered from the aeration zone back through the aeration zone and recovering another portion of the liquid as a separate stream, and digesting said separate stream of the liquid in the presence of a bacterial culture.

29. A system for maintaining a partial life cycle which comprises means for collecting manure produced by a plurality of animal subjects, a holding tank for receiving said manure in the presence of an aqueous medium, means for recovering the solid grass and liquid portions of the holding tank as separate portions, means for washing said solid grass portion with water, an aeration zone, means for combining the liquid portion of the manure and the wash water and delivering a stream of the combined liquid through the aeration zone, means in the aeration zone for forming the liquid into a film with both surfaces of the film exposed to oxygen, means for continuously recycling a major portion of the liquid recovered from the aeration zone back through the aeration zone whereby the liquid is exposed to oxidizing enzymes in the presence of oxygen until digested to the desired extent, means for recovering another portion of the liquid as a separate stream, and means for digesting said separate stream of liquid in the presence of a bacterial culture.

30. A method of maintaining a partial life cycle which comprises collecting manure produced by a plurality of animal subjects, said manure having a liquid portion and an undigested grass solids component, containing said manure in a holding tank in the presence of an aqueous medium, separating the solid grass portion of the manure by washing the manure on a screen, recovering the wash water from the grass, combining the liquid portion of the manure and the grass wash water, recycling at least a portion of the combined liquid as a stream to the holding tank as additional wash liquid, recovering the solid grass as a separate component and returning the recovered grass to said animal subjects for use as bedding.

* * * * *